No. 846,079. PATENTED MAR. 5, 1907.
V. A. YOST.
EXTENSIBLE SHAFT.
APPLICATION FILED NOV. 7, 1906.
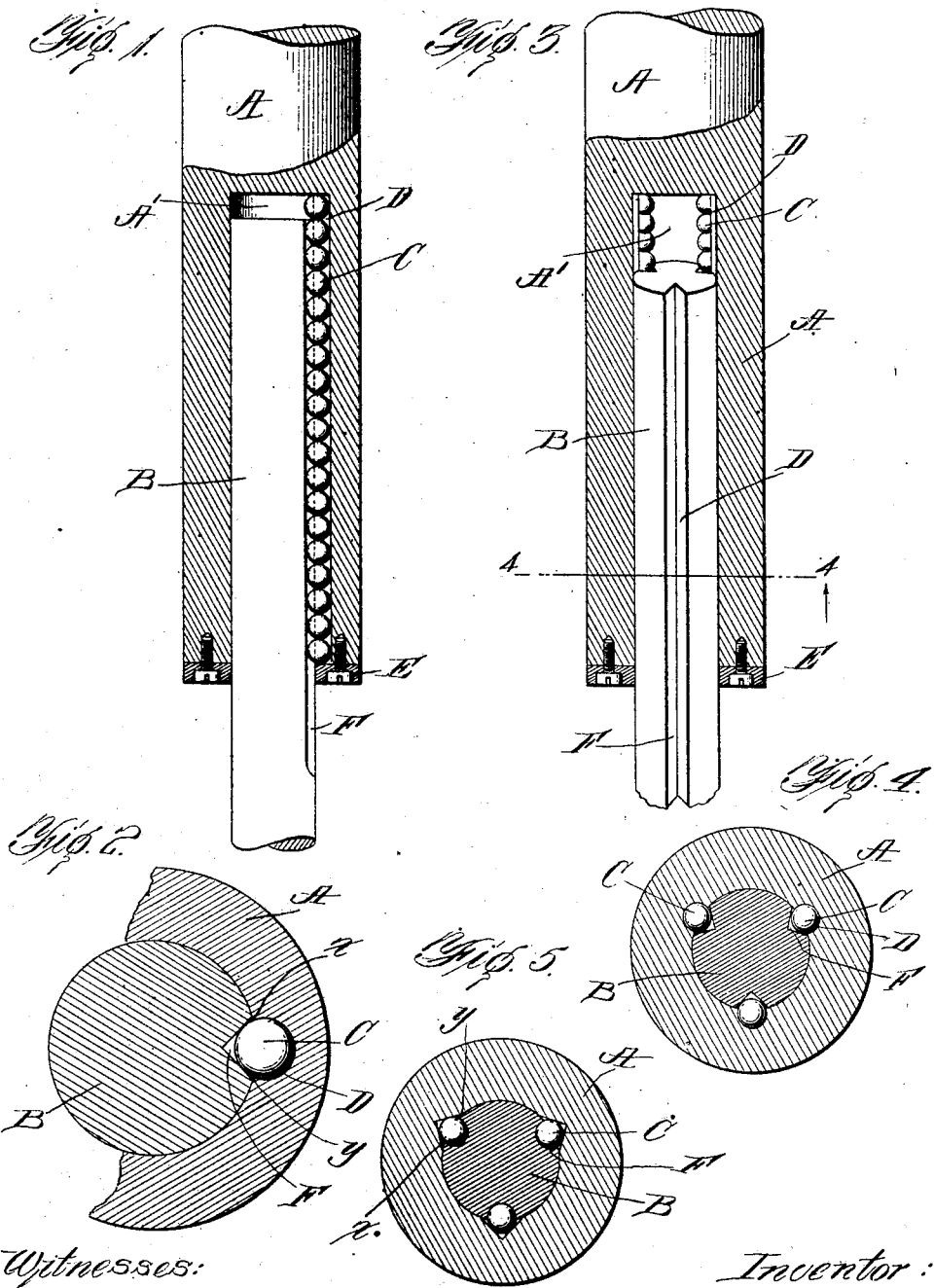
Witnesses:
Paul J. Gathmann
M. Lilian Adams.
Inventor:
Victor A. Yost.
By his Attorneys:
Baldwin Wright

UNITED STATES PATENT OFFICE.

VICTOR A. YOST, OF OSSINING, NEW YORK.

EXTENSIBLE SHAFT.

No. 846,079.　　　Specification of Letters Patent.　　　Patented March 5, 1907.

Application filed November 7, 1906. Serial No. 342,406.

*To all whom it may concern:*

Be it known that I, VICTOR A. YOST, a citizen of the United States, residing in Ossining, in the county of Westchester and State of New York, have invented certain new and useful Improvements in Extensible Shafts, of which the following is a specification.

The object of my invention is to provide an extensible shaft made in sections of such construction and so connected that while the two parts will rotate together coincidently one part may be moved endwise relatively to the other part with a minimum amount of friction to lengthen or shorten the shaft.

In carrying out my invention I form a bore or socket in one shaft-section, which receives one end of the other section, and I employ antifriction-balls to key the shaft-sections together. These balls are arranged in a suitably-shaped retaining-groove in one of the sections, but extend into a shallower groove in the other section. While acting as a key or feather to connect the shaft-sections for simultaneous rotation, they serve also to largely reduce friction during the endwise adjustment of the shaft.

While a single set of balls is usually sufficient to key the sections together and to sufficiently reduce friction, I may employ one or more additional sets to reduce friction to a greater extent.

My improvements are especially intended to be applied to connect a motor-shaft with a driven shaft used to operate a tool or device requiring endwise as well as rotary movement.

In the accompanying drawings, Figure 1 is a view, partly in elevation and partly in section, showing a shaft made in sections and connected in accordance with my invention, one section or member being a driving-shaft or motor, while the other is a driven shaft. Fig. 2 shows a transverse section of the same on an enlarged scale. Fig. 3 is a view similar to Fig. 1, showing a modification. Fig. 4 shows a transverse section of the shaft illustrated in Fig. 3 on the line 4 4 of Fig. 3. Fig. 5 shows a transverse section of a shaft of modified construction.

Referring first to Fig. 1, the shaft-section A is shown as being formed with a centrally-spaced bore or socket A', which extends from one end of the shaft into the same for a distance somewhat greater than the maximum slidable space allowed and which receives the shaft-section B, which latter is free to play endwise therein. In order to connect the shaft-sections for simultaneous or coincident rotation, I key them together by means of a series of antifriction-balls C. These balls, while acting efficiently to key the sections together, also reduce largely the friction which would occur if an ordinary key or feather were employed. When the shaft-sections rotate together, the balls do not move in their grooves; but when one shaft-section moves endwise relatively to the other, the balls rotate about their own axes and act as any ordinary ball-bearings to reduce friction.

Fig. 2 illustrates more clearly how the balls are arranged in the shaft-sections. As there shown, a groove D is formed longitudinally in the section A adjoining the bore thereof. It extends from the outer end of the section A inward to the end of the socket; but the diameter of the groove is to one side of the socket, as clearly shown in Fig. 2—that is, the opening from $x$ to $y$ of the groove D is shorter than the diameter or largest part of the groove. This is for the purpose of preventing the balls from falling out into the socket or bore. The balls are inserted endwise into the groove D and are held therein by means of a cap E. The member B is formed with a longitudinal groove F to receive those portions of the balls which project into the bore A'. The section B may be entirely withdrawn from the section A, if desired, and yet the balls will be retained in proper position in their groove in the section A; but the section B may be readily inserted in its socket and when inserted is locked or keyed in such manner as to rotate with the section A.

Instead of employing a single line or series of balls I may employ a plurality thereof, as indicated in Figs. 3 and 4. In this way friction is further reduced. This may be desirable when the invention is applied to some classes of machinery requiring an extensible shafting having a very free endwise movement.

Instead of retaining the balls in grooves formed in the outer or inclosing section of the shaft they may be retained in properly-formed grooves in the inner section in the manner shown in Fig. 5.

I claim as my invention—

1. An endwise-extensible shaft comprising two separable members one of which is formed with a bore or socket into which the other member fits snugly to prevent lateral movement while being free to slide longitudinally, a key directly connecting the two members for coincident rotation formed of rotatable antifriction devices, and means for holding said devices in place, both while the shaft members are connected and when they are separated.

2. An endwise-extensible shaft comprising two separable members one of which is formed with a bore or socket into which the other member fits snugly to prevent lateral movement while being free to slide longitudinally, a key directly connecting the two members for coincident rotation formed of rotatable antifriction-balls, and means for holding said balls in place in series parallel with the axis of the shaft, both while the shaft members are connected and when they are separated.

3. An endwise-extensible shaft comprising two separable members formed with longitudinal grooves, a longitudinal series of balls arranged in said grooves in said shaft members, and a cap on the end of the outer shaft member closing the end of the groove therein and preventing the balls from moving endwise out of the groove.

4. An endwise-extensible shaft comprising two members one fitting within the other, one of which is formed with a groove, a longitudinal series of balls contained in said groove and the other of which shaft members is formed with a corresponding groove into which the balls extend, the width of said first-mentioned groove next the other member being less than the diameter of the balls, whereby the balls are prevented from moving laterally out of said groove when the shaft members are separated.

5. An endwise-extensible shaft comprising two separable members one of which is formed with a bore or socket into which the other member fits snugly to prevent lateral movement while being free to slide longitudinally, the socketed member of said shaft being formed with a longitudinal groove opening into the bore of the shaft member and the other member of said shaft being formed with a shallower groove, a series of antifriction-balls arranged in said grooves and keying the shaft members together for coincident rotation, and a cap on the outer end of the outer member for preventing the balls from moving endwise out of the groove therein when the shaft members are separated.

In testimony whereof I have hereunto subscribed my name.

VICTOR A. YOST.

Witnesses:
JOHN A. HAURE,
C. B. OWEN.